(12) United States Patent
Cunningham

(10) Patent No.: US 8,556,522 B2
(45) Date of Patent: Oct. 15, 2013

(54) CONNECTORS WITH COMPONENTS HAVING A LABEL AND RELATED CABLE ASSEMBLIES

(75) Inventor: Dave E. Cunningham, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 147 days.

(21) Appl. No.: 13/117,426

(22) Filed: May 27, 2011

(65) Prior Publication Data

US 2012/0301087 A1 Nov. 29, 2012

(51) Int. Cl.
 G02B 6/38 (2006.01)
 G02B 6/36 (2006.01)
 G02B 6/00 (2006.01)

(52) U.S. Cl.
 USPC .................. 385/75; 385/53; 385/55; 385/70; 385/134; 385/147

(58) Field of Classification Search
 USPC .............. 385/53, 55, 56, 58, 60, 70–72, 134, 385/139, 75–78
 See application file for complete search history.

(56) References Cited

U.S. PATENT DOCUMENTS

| | | | |
|---|---|---|---|
| 4,258,487 A | 3/1981 | Hohorst | 40/2 |
| 4,550,964 A | 11/1985 | Donais et al. | 339/44 |
| 4,927,383 A | 5/1990 | Durkop et al. | 439/491 |
| 5,764,043 A | 6/1998 | Czosnowski et al. | 324/66 |
| 6,968,994 B1 | 11/2005 | Ashwood Smith | 235/375 |
| 7,080,945 B2 | 7/2006 | Colombo et al. | 385/92 |
| 7,298,946 B2 | 11/2007 | Mueller | 385/100 |
| 7,340,146 B2 | 3/2008 | Lampert et al. | 385/139 |
| 7,372,561 B2 | 5/2008 | Shibata et al. | 356/237.5 |
| 7,585,191 B2 | 9/2009 | Hawley et al. | 439/676 |
| 7,745,740 B2 | 6/2010 | Smith | 174/650 |
| 7,794,270 B1 | 9/2010 | Lin et al. | 439/491 |
| 8,049,769 B2 * | 11/2011 | Nakanishi et al. | 347/171 |
| 2006/0009068 A1 | 1/2006 | Greene et al. | 438/488 |
| 2006/0093282 A1 | 5/2006 | Shepherd et al. | 385/90 |
| 2008/0133047 A1 | 6/2008 | Best et al. | 700/215 |
| 2008/0314989 A1 | 12/2008 | Eray | 235/492 |
| 2009/0260268 A1 | 10/2009 | Gibson et al. | 40/638 |
| 2009/0269014 A1 | 10/2009 | Winberg et al. | 385/78 |

FOREIGN PATENT DOCUMENTS

GB 2387042 2/2003

* cited by examiner

Primary Examiner — Kaveh Kianni
Assistant Examiner — Hung Lam

(57) ABSTRACT

Connectors and cable assemblies having a label stored in a label storage area of a component of the connector along with methods for making the same are disclosed. The label is extendable from the label storage area with a label length that is longer than a length of the label storage area, thereby providing the craft with adequate space for marking information. Suitable components of the connector for the label storage area include housings, boots, clips and the like. Further, the label storage area protects the label from damage while also maintaining a relatively small footprint for the connector.

18 Claims, 4 Drawing Sheets

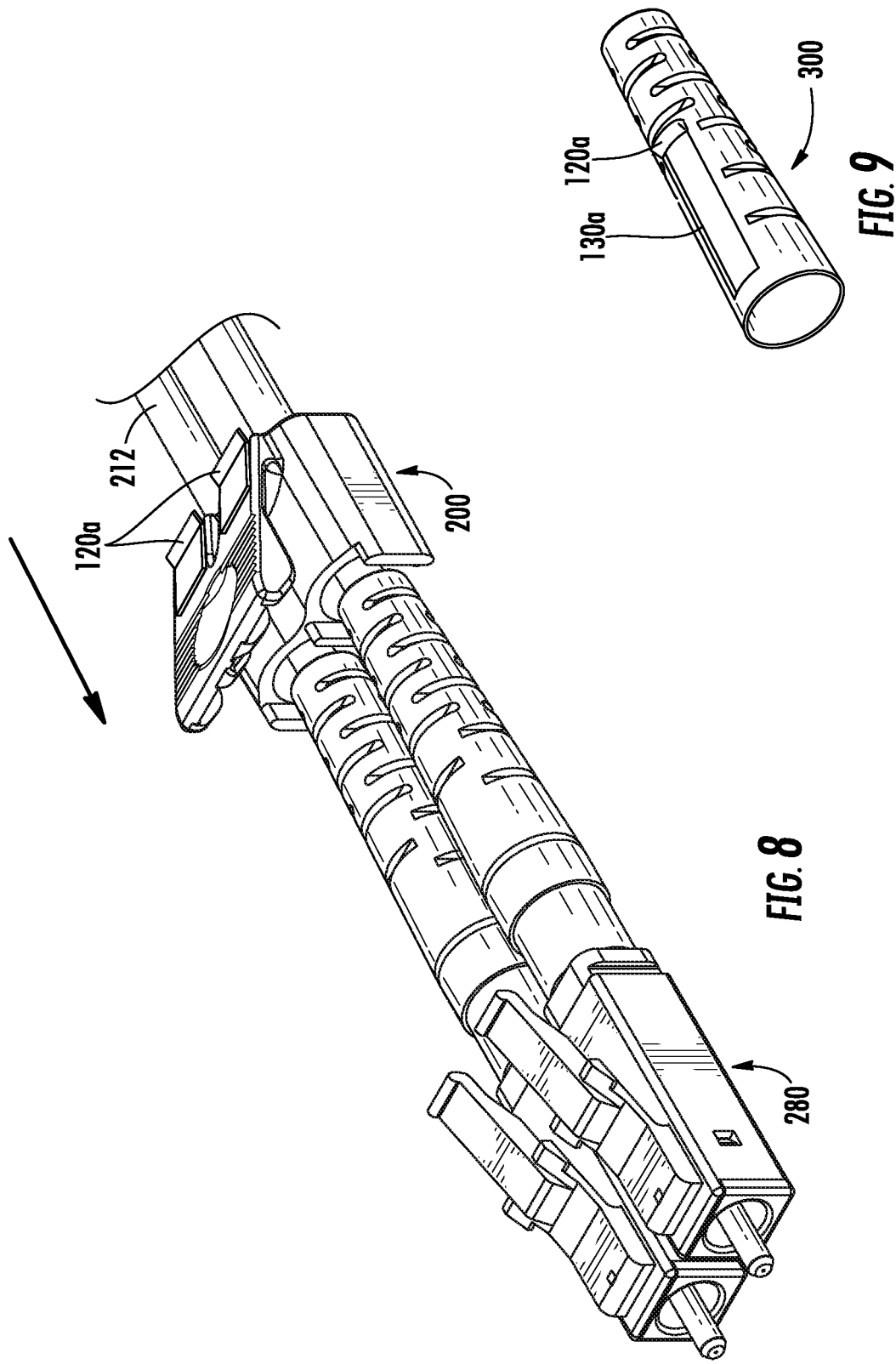

CONNECTORS WITH COMPONENTS HAVING A LABEL AND RELATED CABLE ASSEMBLIES

BACKGROUND

The disclosure is directed to connectors and related cable assemblies having at least one label for identification purposes. More specifically, the disclosure is directed to connectors with components having one or more labels stored therein along with related cable assemblies using the components and methods for making the same.

Optical fiber is increasingly being used for a variety of applications, including but not limited to broadband voice, video, and data transmission. Optical networks typically include patch panels (i.e., arrays of connectors) connected by jumper cable assemblies. The patch panels provide a common location where moves, adds, or changes to connectivity of the channels of the optical network can be made by changing the ports for the jumper cable assemblies. Likewise, testing and troubleshooting may also occur that the patch panel. The patch panels typically have a relatively large and dense array of optical connections and determining which port a particular jumper cable is optically attached with can be difficult and/or time consuming for the craft. Consequently, the craft often labels the jumper cables at the patch panels so if troubleshooting or moves, adds, changes are required it is easy for the craft to identify the desired jumper cable.

By way of example, FIG. 1 depicts a prior art cable assembly including a label for aiding the craft when trying to identify a specific link in the network. Specifically, the cable assembly includes a fiber optic connector 10 attached to a fiber optic cable 12 with a label 14 adhesively attached to fiber optic cable 12. As shown, label 14 is a flag label that is attached to the cable 12 and allows the craft to read the same when the cable assembly is installed in the patch panel. However, the flag label of FIG. 1 has drawbacks such as adding bulk and/or obstructions at a point where the small diameter of the cable is critical for cable management especially in high-density patch panels. Moreover, it is relatively easy for the flag label to be inadvertently torn, ripped or otherwise removed from the cable assembly.

Other types of labels have been used that overcome the drawbacks of flag labels; however, these other labels also have drawbacks. Illustratively, FIG. 2 depicts another prior art cable assembly with different type of label. Specifically, the cable assembly includes label 14 which is configured as a wrap-around label. In other words, label 14 of FIG. 2 is adhesively attached to and wrapped about fiber optic cable 12. Generally speaking, the wrap-around label 14 solves some of the issues of flag label of FIG. 1, but the wrap-around label 14 has its own drawbacks. For instance, wrap-around label 14 does not add bulk and/or the obstructions like the flag label of FIG. 1, but there typically is not enough marking area on the label for detailed labeling. Further, the craft may find it difficult to read the label when the cable assembly is secured to the patch panel. Consequently, the craft may have to remove the connector 10 of the cable assembly from the patch panel and rotate the cable assembly to read the wrap-around label 14.

Still other labels for cable assemblies exist such as bands that snap about the cable, but these labels can migrate along the length of the cable and may be difficult to quickly locate in a densely-packed patch panel. Consequently, there is an unresolved need for easy and efficient labeling for connectors such as electrical or fiber optic connectors and their related cable assemblies.

SUMMARY

The disclosure is directed to components of connectors such as housings, boots, clips and the like having one or more labels stored therein along with related cable assemblies using the components and methods for making the same. The connectors include a label stored in a label storage area of one or more components of the connector. The label is extendable from the label storage area with a label length that is longer than a length of the label storage area, thereby providing the craft with adequate space for marking information. Further, the label storage area protects the label from damage while also maintaining a relatively small footprint for the connector.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 8 depicts the component of FIG. 7 being positioned about a plurality of cable assemblies and then being slid toward the connectors for attachment to the connectors;

FIG. 9 depicts a perspective view of another component of a connector having a label.

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts.

The connectors and/or cable assemblies described herein are suitable for making optical and/or electrical connections for a variety of devices. The concepts of the disclosure advantageously allow the simple, quick, and economical marking for connectors and/or cable assemblies while also providing a suitable surface for identifying the link by the craft. Reference will now be made in detail to the preferred embodiments, examples of which are illustrated in the accompanying drawings. Whenever possible, like reference numbers will be used to refer to like components or parts.

Figure 1:
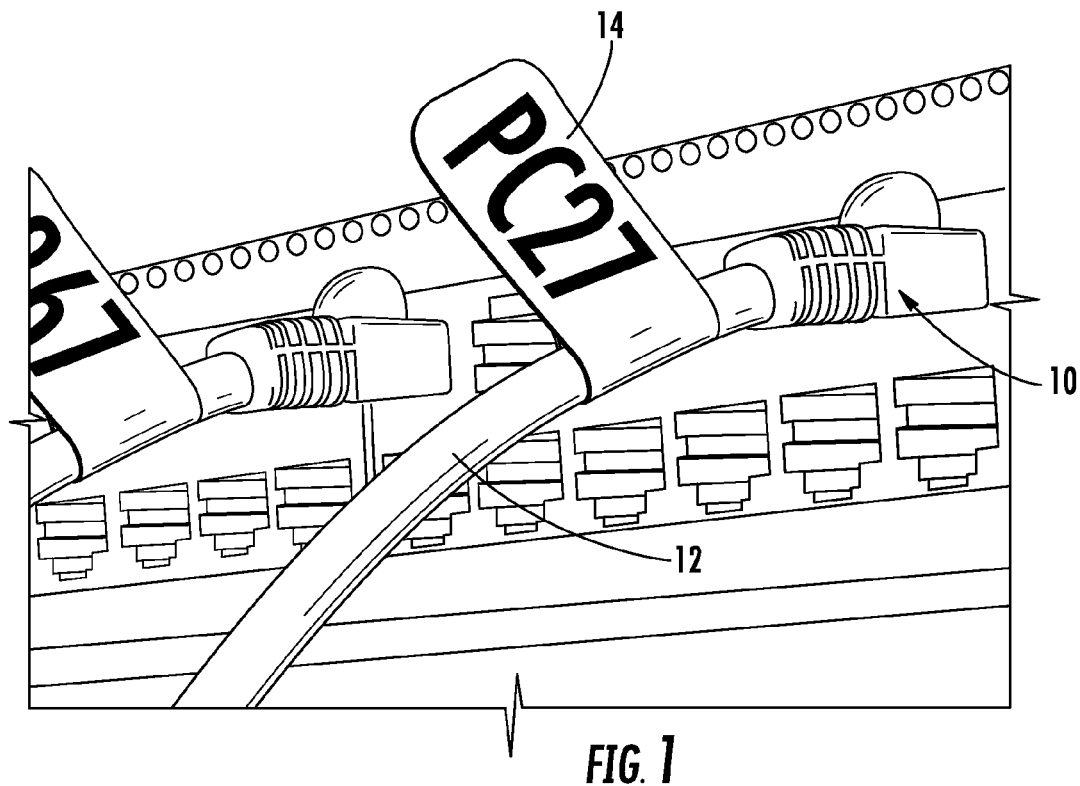
FIG. 1 is perspective view of a prior art flag label attached to a cable assembly that is connected at a patch panel.
Figure 2:
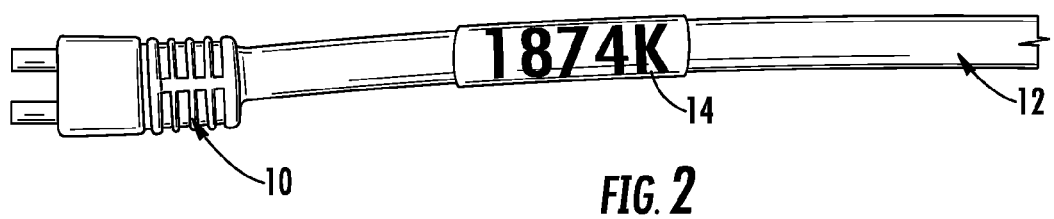
FIG. 2 is a top view of a prior art wrap-around label attached to a cable assembly.
Figure 3:
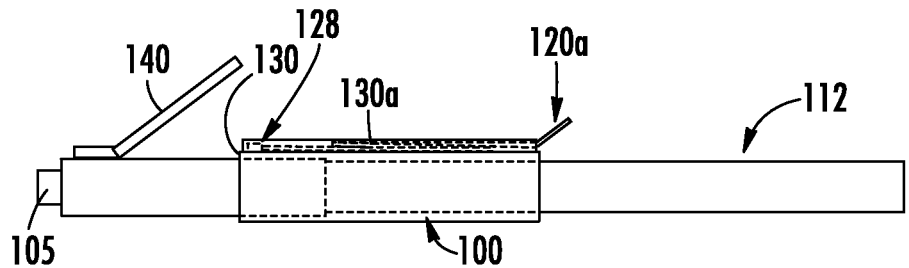
FIG. 3 is a schematic representation of a cable assembly having a connector with a label that extends from the connector with the label in the stored position.
Figure 4:
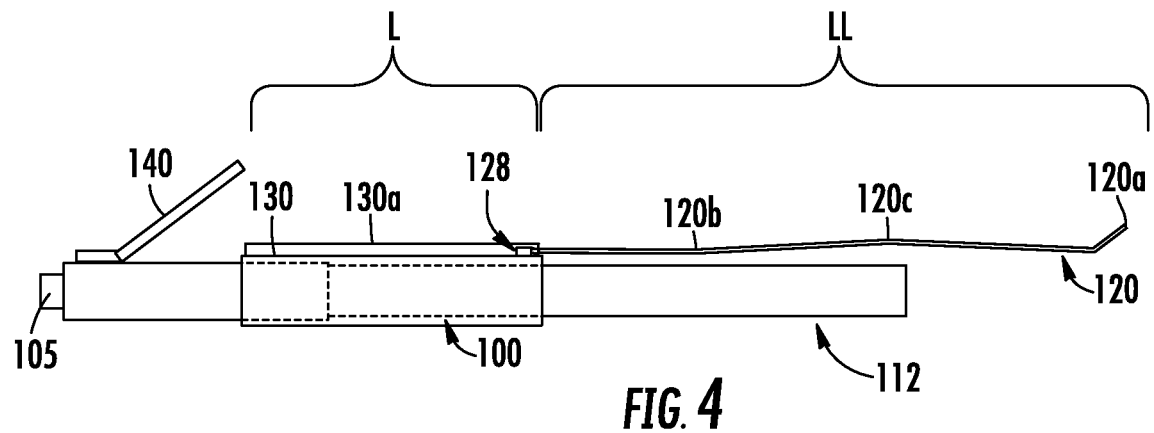
FIG. 4 is a schematic representation of the cable assembly of FIG. 3 with the label of the connector in the extended position so the craft can read the information on the label.

FIGS. 3 and 4 are schematic representations depicting a cable assembly having a connector 100 with a label 120 and a cable 112. Specifically, FIG. 3 shows label 120 of connector 100 in a stored position and FIG. 4 shows label 120 of connector 100 in an extended position. More specifically, connector 100 has label 120 that fits into a component 130 of the connector 100 defining a label storage area 130a. As shown in FIG. 3, label 120 is disposed within a portion of the label storage area 130a. The label 120 is extendable from the label storage area 130a so the craft can extend the label 120 when desired for reading the marking information on the label 120 for the link. Moreover, label 120 may be positioned into the stored position when not needed, thereby inhibiting damage and/or accidental removal of the label 120. Additionally, label 120 has a label length LL that is longer than a length L of the label storage area 130a. By way of example, the label length LL is at least 1.5 times longer than the length L of the label storage area 130a. Other variations can have the label length LL at least twice as long as the length L of the label storage area 130a or more. There are several different ways to make the label length LL longer than the length L of the label storage area 130a such as disclosed herein. Consequently, the connectors and components of the disclosure advantageous provide a label with a suitable length that is easy to read and store while not being overly obtrusive or creating a connector that is too large for densely packed patch panels.

The concepts disclosed herein may be used with any suitable connector and/or any suitable connector component. By way of example, the connector may include electrical conductors such as copper traces, pins, etc., optical waveguides such as optical fiber, or hybrid connectors having both electrical and optical pathways. Illustratively, a conductor pathway 105 may be an electrical pin or a ferrule for an optical fiber, which is mated to a complimentary structure to form a communication connection. Further, the connector 100 may have a single communication pathway or configured with multiple communication pathways. By way of example, an optical connector may be selected from a single-fiber connector or a multi-fiber connector.

Figure 5:
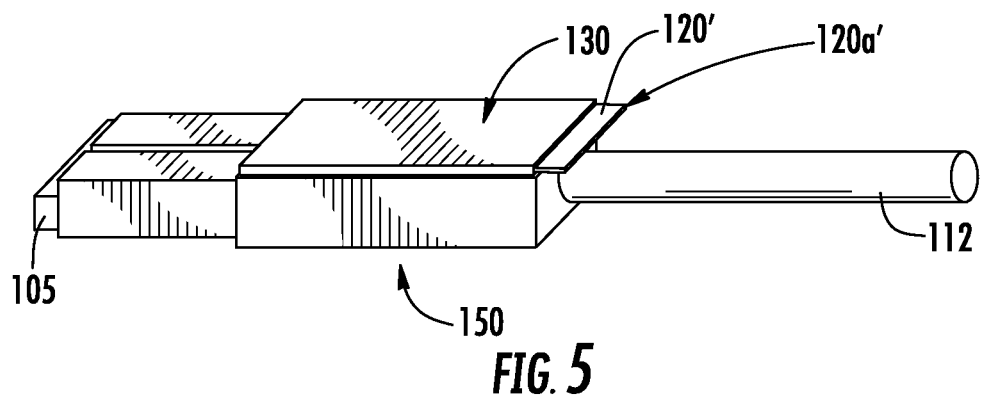
FIG. 5 is a schematic representation of another cable assembly having a connector with a label that extends from the connector with the label in the stored position.
Figure 6:
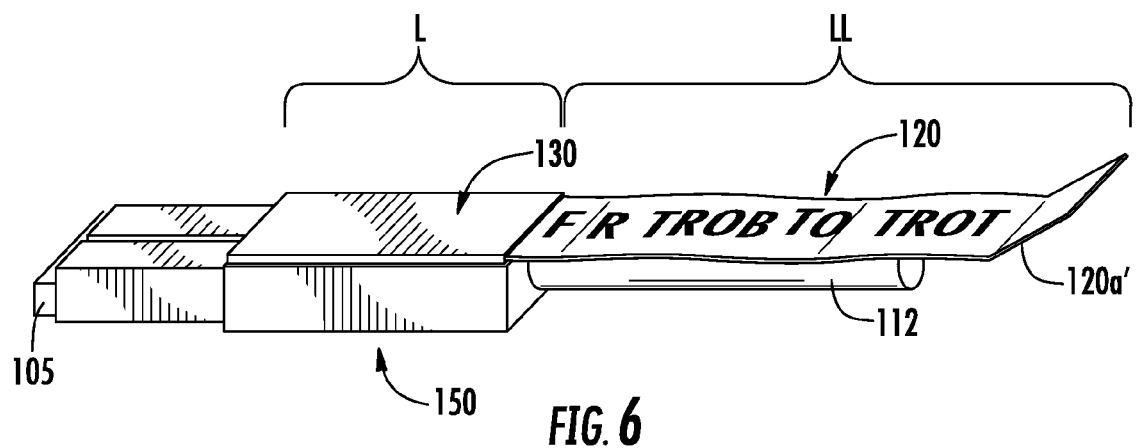
FIG. 6 is a schematic representation of the cable assembly of FIG. 5 with the label of the connector in the extended position so the craft can read the information on the label.
Figure 7:
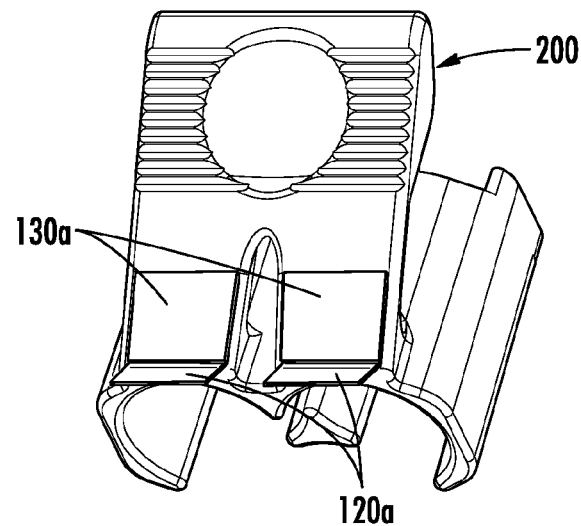
FIG. 7 is a perspective view of another component of a connector that may be attached to one or more cable assemblies where the component has a plurality of labels shown in the stored position that can extend from the component for identification by the craft.

The label storage area 130a may be disposed on any suitable component(s) of the connector such as a housing, a boot, a clip or other suitable component. As shown, FIGS. 3-6 show the label storage area formed by a portion of the housing 130. The label storage area is suitable for storing a suitably long label length LL relative to the length L of the label storage area. Alternatively, one or more label storage areas may be formed on a clip 200 such as shown in FIGS. 7 and 8. The clip 200 can have other functional features or solely function as a label providing device (i.e., a retro-fit application for labeling existing cable assemblies) as discussed in further detail herein.

Several different ways to make the label length longer than the length of the label storage area. Illustratively, FIGS. 3 and 4 depict folding the label, thereby allowing a label length LL that is longer than the length L of the label storage area 130a. For instance, the label 120 may be folded at least once generally transverse to the length L of the label storage area to create a longer length. Additionally, the label may also have one or more folds in a direction generally aligned with axis of the connector to further increase the useful area for marking information on the label. Illustratively, FIG. 4 shows label 120 being folded at least twice with folds 120b and 120c in label 120 for storing the same within the label storage area; however, the label may folded two or more times. Simply stated, the craft can fully extend label 120 for reading the marking information as shown. When storage of the label is desired the craft can move fold 120c toward a movable stop 128 of the label and then slide label 120 into the label storage area 130a. Movable stop 128 allows the label to slide out of the label storage area, but inhibits the inadvertent removal of the label 120 from the label storage area. However, the movable stop 128 can be configured with a release so that the label 120 is removable from the label storage area 130a for marking and/or replacement by the craft.

Label 120 may optionally include a pull tab 120a that protrudes from the label storage area when the label is in the stored position such as shown in FIG. 3. Connector 100 may also include a latching mechanism 140 and/or other desired features, but depending on the style of connector the latching mechanism may not be used.

Other ways for making the label length LL longer than the length L of the cable storage area are possible. For instance, rolling the label within the label storage area can provide a longer label length LL as shown in FIGS. 5 and 6. Specifically, FIG. 5 is a schematic representation of another cable assembly with a connector 150 having a label 120' and cable 112 with the label 120' in a stored position. Label 120' fits into a component 130 of the connector 100 defining a label storage area and is extendable from the label storage area when desired by the craft. As shown, label 120' includes an optional pull tab 120a'. Label 120 can have any suitable materials and/or structure for inducing a roll into the label 120. By way of example, label 120 may be formed from a material having a shape memory that retracts the label into a rolled form within the connector using its shape memory. Other embodiments can have a rotating structure on the component of the connector such as a torsional spring or the like on the housing 130 for winding the label into a stored position. Preferably, any structure is sufficiently small so as to not substantially increase the connector footprint. FIG. 6 is a schematic representation of the cable assembly of FIG. 5 showing label 120 of the connector 150 in the extended position so the craft can read the information on the label as shown.

FIG. 7 is a perspective view of another component 200 of a connector that includes a label. Component 200 is a clip that may be attached to one or more cable assemblies and defines at least one label storage area 130a with label disposed therein, which are extendable from the same with lengths as discussed herein. In this embodiment, component 200 includes a plurality of labels having respective pull tabs 120a since the component is configured as a duplex clip for single fiber connectors, but other clips could include a single label. For instance, the component could be a single or duplex clip for a connector that attaches to a connector solely for retro-fit labeling of connectors. Likewise, components arranged as clip could include more than two connectors or be directed to multiple fiber connectors. The illustrated embodiment of FIG. 7 also include further functionality it includes an optional trigger (not numbered) for working a latching mechanism of the connectors.

Labels of component 200 can either include a folding label similar to that shown in FIG. 4 or a rolling label similar to that shown in FIG. 6 where the label has a label length that is longer than the length of the label storage area, thereby providing the craft with sufficient space for marking information. Clip can include other features such as latches for snap-fitting to the connectors as known in the art. FIG. 8 depicts the component 200 being positioned about a plurality of cable assemblies and then being slid toward the connectors 280 as represented by the arrow and being attached thereto. Other suitable components of the connector may also include the label storage area. For instance, the boot of the connector can include a slot or groove as a label storage area for receiving a label that folds when in the stored position.

Still other components of the connector such as connector boots may have a label according to the concepts disclosed herein. As an explanatory example, FIG. 9 shows component 300 which is a boot for a suitable connector of a cable assembly. Component 300 depicts the label in a stored position which is movable to the extended position. As with the other components, the label that fits into the label storage area 130a defined by component 300. The label is extendable from the label storage area 130a of the boot so the craft can extend the same for reading the marking information on the label 120 for the link and move to the stored position when not needed. Additionally, label has a label length that is longer than a length of the label storage area 130a such as disclosed herein. Component 300 can include a groove or passageway for as the label storage area 130a and the label may have a pull tab 120a as shown. Component 300 can fit on the back end of the connector such as shown in FIG. 8 and also provides cable strain relief at the back end of the connector.

Methods for making the connector are also disclosed. For instance, methods for making a fiber optic connector including the steps of providing a fiber optic connector having a component with a label storage area, providing a label having a label length that is greater than a length of the label storage area, and placing the label into the label storage area. Methods can also include steps for making cable assemblies such as the step of attaching the fiber optic connector to a cable, thereby forming a cable assembly. Further, optional steps for making the fiber optic connector may include the step of folding the label for placing the label into the label storage area.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

I claim:

1. A connector having a label, comprising:
   a label storage area; and
   a component of the connector defining the label storage area with the label being disposed within a portion of the label storage area, wherein the label is extendable from the label storage area, and the label having a label length that is longer than a length of the label storage area;
   wherein the label has a folded position where the label is folded at least once at a first fold and an extended position where the label is unfolded at the first fold, the label including a pull tab located at an end of the label, the label being folded in the folded position such that the pull tab is located outside the label storage area to allow manual grasping of the pull tab.

2. The connector of claim 1, wherein the label length is at least twice as long as the length of the label storage area.

3. The connector of claim 1, wherein the label has the folded position where the label is folded at least twice at the first fold and a second fold such that the pull tab is located outside the label storage area and the extended position where the label is unfolded at each of the first fold and the second fold.

4. The connector of claim 1, the label being folded at least twice when in the stored position.

5. The connector of claim 1, wherein the label is formed of a flexible material, the first fold being formed of the flexible material of the label.

6. The connector of claim 1, the connector selected from the group consisting of a single optical fiber connector or a multi optical fiber connector.

7. The connector of claim 1, the component of the connector being a housing, a boot, or a clip.

8. The connector of claim 1 being a portion of a cable assembly.

9. A fiber optic connector having a label, comprising:
   a ferrule; and
   a component of the fiber optic connector defining a label storage area with the label being disposed within a portion of the label storage area and being extendable therefrom, and the label having a label length that is longer than a length of the label storage area;
   wherein the label has a folded position where the label is folded at least once at a first fold and an extended position where the label is unfolded at the first fold, the label including a pull tab located at an end of the label, the label being folded in the folded position such that the pull tab is located outside the label storage area to allow manual grasping of the pull tab.

10. The fiber optic connector of claim 9, wherein the label length is at least twice as long as the length of the label storage area.

11. The fiber optic connector of claim 9, wherein the label has the folded position where the label is folded at least twice at the first fold and a second fold such that the pull tab is located outside the label storage area and the extended position where the label is unfolded at each of the first fold and the second fold.

12. The fiber optic connector of claim 9, the label being folded at least twice when in the stored position.

13. The fiber optic connector of claim 9, is formed of a flexible material, the first fold being formed of the flexible material of the label.

14. The fiber optic connector of claim 9, the connector selected from the group consisting of a single-fiber connector or a multi-fiber connector.

15. The fiber optic connector of claim 9 being a portion of a cable assembly.

16. A method of making a fiber optic connector, comprising the steps of:
   providing a fiber optic connector having a component with a label storage area;
   providing a label having a label length that is greater than a length of the label storage area; and
   folding the label at least once at a first fold; and
   placing the label into the label storage area with the label folded such that a pull tab located at an end of the label is located outside the label storage area to allow manual grasping of the pull tab.

17. The method of claim 16, further including the step of attaching the fiber optic connector to a cable to form a cable assembly.

18. The connector of claim 1, wherein a conductor pathway extends through the connector, the label storage area extending substantially parallel to the conductor pathway.

* * * * *